United States Patent [19]

Inaji et al.

[11] Patent Number: 5,737,483
[45] Date of Patent: Apr. 7, 1998

[54] MOTOR SPEED CONTROL APPARATUS FOR MOTORS

[75] Inventors: Toshio Inaji, Minoo; Eiji Ueda, Yawata; Keisuke Matsuo, Neyagawa, all of Japan

[73] Assignee: Matsushita Electric Industrial Co., Ltd., Osaka-fu, Japan

[21] Appl. No.: 548,047

[22] Filed: Oct. 25, 1995

[51] Int. Cl.$^6$ .................................................. H02P 5/06
[52] U.S. Cl. ........................ 388/805; 318/632; 318/609; 388/902; 388/907.5; 388/906
[58] Field of Search .................................... 388/805, 803, 388/907.5, 902, 906, 909, 930; 318/609, 610, 632, 254, 138, 435, 600, 567, 571

[56] References Cited

U.S. PATENT DOCUMENTS

| | | |
|---|---|---|
| 4,745,563 | 5/1988 | Kaku et al. . |
| 5,392,378 | 2/1995 | Tohyama ................... 388/803 |
| 5,471,880 | 12/1995 | Lang et al. ............. 318/600 X |

FOREIGN PATENT DOCUMENTS

| | | |
|---|---|---|
| 0599190 | 6/1994 | European Pat. Off. . |
| 63092283 | 5/1988 | Japan . |
| 5197978 | 8/1993 | Japan . |
| WOA9209016 | 5/1992 | WIPO . |

Primary Examiner—Karen Masih
Attorney, Agent, or Firm—Wenderoth, Lind & Ponack

[57] ABSTRACT

A motor speed control apparatus is provided in which the controllable frequency band of the control system can be sufficiently enhanced with a comparatively simple structure even if the frequency generator equipped into the motor is low in output frequency and the rotational accuracy can be highly improved even if the disturbance of high frequency components of load torque is applied to the motor. The frequency band of the control system can be improved by using the estimated speed signal as the speed feedback signal. A motor speed control apparatus superior in disturbance control characteristic can be realized through the feed forward compensation of an estimated load torque.

26 Claims, 10 Drawing Sheets

MOTOR SPEED CONTROL APPARATUS FOR MOTORS

BACKGROUND OF THE INVENTION

1. Field of the Invention

This invention relates to a motor speed control apparatus having a frequency generator (FG).

More particularly, the present invention relates to a motor speed control apparatus which is capable of providing a stabilized rotation control system and high accuracy rotation of a motor even when a frequency which the frequency generator generates is low. The motor is rotation-controlled at a low-speed, otherwise the frequency generator for generating high frequencies cannot be employed from a structural and economical viewpoint.

2. Description of the Prior Art

A trend of down-sizing the light-weight video cassette recorders (hereinafter abbreviated as VCR) or camera incorporated type VCR (hereinafter called VCR Camcoder) has recently taken place, necessarily leading to the down-sizing of motors to be used for them. Particularly, referring to capstan motors for running a tape at a constant speed, an outstanding reduction in rotor inertia of a rotor resulting from a progressive down-sizing trend contributes to a extreme degradation in rotation accuracy.

Also, in order to realize a long recording duration by decreasing a tape running speed of the VCR, the capstan motor is required to be rotated at a low speed. However, when rotating at the low speed, a period of a frequency signal for detecting a rotating speed of the motor becomes large, resulting in an increase in detection delay of the rotating speed of the motor.

As a result, when rotating the motor at the low speed, a control gain cannot be set high such that the speed control system of the motor can be stabilized.

Accordingly, there arises a problem that a controllability of these motors may be degraded.

The motor speed control apparatus in the prior art will be described below while referring to drawings.

FIG. 13 is a block diagram showing a most basic structure of a conventional motor speed control apparatus. In FIG. 13, reference numeral 1 is a motor, 2 is a frequency generator for generating a frequency signal fs proportional to a rotating speed of the motor 1, 3 is a period detector for detecting a period of the frequency signal fs, 5 is a comparator for comparing a speed signal N outputted from the period detector 3 with a speed command signal Nr (constant value) to output a deviation signal ΔN, 6 is a controller for applying control compensations such as proportional and integral compensations to the deviation signal ΔN to output a control signal C and 4 is a drive circuit for supplying the motor with a driving current in accordance with the control signal C.

Next, the operation of the conventional motor speed control apparatus shown in FIG. 13 will be explained below.

When the rotating speed of the motor is being controlled almost uniformly, the period of the frequency signal fs in a vicinity of an operation point is inversely proportional to the rotating speed of the motor. As a result, an output of the period detector 3 is made the speed signal N.

Namely, the rotating speed of the motor 1 is sampled by the frequency signal fs of the frequency generator 2, and a sampling result is held during the period. As a result, the speed signal N of the rotating speed through the period detector 3 is not the detected value of an instantaneous rotating speed when sampling, but a mean rotating speed per period obtained by integrating the frequency signal fs over one period with respect to time.

FIG. 14 is a waveform diagram showing a relation of the rotating speed of the motor and the rotating speed N outputted from the period detector 3, in which a reference numeral 61 denotes an instantaneous rotating speed n supposed to be changed as shown in the waveform diagram, and 62 denotes the rotating speed N outputted from the period detector 3, which is sampled by the frequency signal f s of the frequency generator 2 to show the mean rotating speed during a period T.

The rotating speed N is, as shown in FIG. 14, changed in steps at time points t (i–1), t(i), t(i+1) . . . with the period of the frequency signal fs and holds a constant value for the time period of each step. The reference numeral 63 shown by a dotted line denotes an estimated rotating speed of the motor estimated from the rotating speed N shown at 62. As shown in FIG. 14, the estimated rotating speed is delayed due to detection time by about T compared with the rotating speed n of the motor. As a result, when controlling the rotating speed using the conventional motor speed control apparatus as shown above, due to the time delay of detection as shown above, a control frequency band cannot be made excessively higher in order to stabilize a control system (about 1/12 of the sampling frequency in general), so that there arises a problem that the controllability of the rotation control system cannot be improved.

In order to solve the above problem, motor speed control apparatuses which are capable of improving the controllability have been proposed previously. For example, according to Japanese Laid-Open Patent Application No. 61-30984, in cases where a position control apparatus is to be used in robots, NC machines tools and the like, a model expressing drive characteristics of the motor is provided in a control apparatus and a speed estimating unit is also provided which is capable of estimating the instantaneous speed n, even during the time period where an output signal of a position detector is not changed, from a general torque τm of the motor and the detected speed value N obtained by operation at every time when the output signal of the position detector is obtained. Further, a motor speed control apparatus to be used in robots and NC machine tools is provided which is capable of reducing a detection time delay of the rotating speed of the motor by using an output of the speed estimating unit as a speed feedback signal.

Discussion will be made below on the speed estimating unit as a member of a conventional motor speed control apparatus to be used in robots and NC machine tools as discussed above. FIG. 15 is a block diagram of a conventional speed estimating unit.

In FIG. 15, a reference numeral 21 is an integrator in which a coefficient $$\frac{1}{(Jn \cdot S)}$$

is a transfer function expressing driving characteristics of the motor, where Jn is a nominal value showing the rotor inertia of the motor and S is a Laplacian, 22 is a proportional integral compensator, where K1 is a proportional gain and K2 is an integral gain, and 23 is an integrator for obtaining a mean value N' during the period T of an output signal n' of the integrator 21 and expressed as follows:

$$N' = \frac{\int n' dt}{T} \quad (1)$$

A reference numeral 24 is a comparator for comparing an output signal N' of the integrator 23 and the rotating speed N generated by the period detector 3 of the motor and outputting its deviation to a sample and holder 26. The sample and holder 26 holds a deviation output of the comparator 26 only during the period T and then outputs it to the proportional integral compensator 22 as the deviation output ΔN. A multiplier 28 for multiplying the control signal C by a coefficient (Ktn·gmn), where Ktn and gmn are nominal values of a torque constant Kt of the motor and a transform coefficient gm of the drive circuit 6, respectively. A reference numeral 25 is a subtracter which compares an estimated values τm' of generated torque of the motor 1 obtained by multiplying the control signal C by the coefficient (Ktm·gmn) by the multiplier 28 and an output τd' of the proportional integral compensator 22 to output a deviation therebetween to the integrator 21.

Next, an operation of the conventional speed estimating unit will be explained in detail by referring to FIG. 15.

In FIG. 15, the integrator 21 may be considered as a model for expressing the driving characteristics of the motor as follows;

$$Jn \cdot \frac{dn'}{dt} = \tau m' - \tau d' \quad (2)$$

Therefore, applying a Laplace transform to equation (2) results in, $$n' = \frac{\tau m' - \tau d'}{Jn \cdot s} \quad (3)$$

From equation (3), the instantaneous rotating speed n of the motor can be estimated, and the estimated rotating speed n' can be obtained by integrating a difference between the estimated value τm' of the generated torque of the motor and the estimated value τd' load torque of the motor divided by the rotor inertia Jn of the motor with respect to time. As a result, in order to obtain the estimated rotating speed n', it is necessary to estimate the load torque τd applied to the motor, however, with the conventional speed estimating unit as shown in FIG. 15, the estimated τd' of the value is obtained by applying simple proportional integration to the deviation ΔN between the detected mean speed N by the period detector 3 and the estimated speed N'0 obtained from the equation (1).

In the conventional motor speed control apparatus as shown above, the instantaneous rotating speed n' is estimated from the estimated value τd' of the load torque and the estimated value τm' of the generated torque of the motor, and the speed control of the motor I is achieved by the rotating speed n' instead of the feedback signal N shown as in FIG. 13. Namely, by using the instantaneous rotating speed n' estimated by the speed estimating unit, the motor can be speed-controlled by using the speed signal having a reduced detection delay as the feedback signal. Therefore, a control gain of a speed control system can be improved compared with an apparatus achieving the speed control using the speed signal N having the detection delay of the period detector 3 as the feedback signal.

With the structure as discussed above, however, proportional integral compensation gains are required to be made large in order to estimate the load torque quickly and accurately. However, when using a method of estimating the load torque from the deviation between the estimated speed and the detected speed detected through operation at each time when the output signal of the position detector is obtained, it is required to form a model almost equivalent to a actual driving model as a speed estimating model. As a result, when taking the time delay due to rotational speed detection or the time delay due to sample holding into consideration, the proportional integral compensation gains for estimating the load torque cannot be set as sufficiently high as desired.

Accordingly, in situations where frequencies of load torque disturbance actually applied to the motor are distributed in the low frequency band only, there arises no problem practically, however, in situations where the frequencies of load torque disturbance are distributed near or in excess of the control frequency band determined by the proportional integral compensation gains, there arises a problem in that if the speed control is carried out using the estimated rotating speed n', the speed change due to load torque disturbance cannot be satisfactorily reduced.

SUMMARY OF THE INVENTION

In view of the above-mentioned problems, an object of this invention is to provide a motor speed control apparatus which makes it possible to sufficiently enhance the control frequency band of the control system even if the frequency generator equipped into the motor is low in output frequency and the rotational accuracy can be highly improved even if the disturbance of high frequency components of load torque is applied to the motor.

In order to attain the above object, a motor speed control apparatus of this invention comprises: a frequency generator for generating a frequency signal proportional to a rotating speed of a motor; a period detector for detecting a period of the frequency signal to output a mean speed signal proportional to a mean rotating speed of the motor; a controller for receiving an externally given speed command signal and a speed feedback signal and for carrying out a control operation thereby to output a control signal; a driver for supplying the motor with a driving current in accordance with the control signal; and a speed estimator for receiving the control signal and the mean speed signal and for estimating a rotating speed of the motor from the control signal to obtain an estimated speed signal to be outputted to the control means as the speed feedback signal, wherein the speed estimator comprises a predictor for comparing the mean speed signal and an estimated mean speed signal obtained by integrating the estimated speed signal with respect to time to generate a mean speed error and to generate a predicted value of an instantaneous speed error from the mean speed error, and a feedback loop for correcting the estimated speed signal by the predicted value generated through the predicting means.

In addition, a motor speed control apparatus of this invention comprises: a frequency generator for generating a frequency signal proportional to a rotating speed of a motor; a period detector for detecting a period of the frequency signal to output a mean speed signal proportional to a mean rotating speed of the motor; a controller for receiving an externally supplied speed command signal and a speed feedback signal and carrying out a control operation thereby to output a control signal; a driver for supplying the motor with a driving current in accordance with the control signal; and a speed estimator for receiving the control signal and the mean speed signal and estimating a rotating speed of the motor from the control signal to obtain an estimated speed signal of the motor to be outputted to the control means as the speed feedback signal, wherein the speed estimator comprises a predictor for generating a predicted value of an instantaneous speed from the mean speed signal, and a feedback loop for comparing the estimated speed signal and the predicted value generated by the predicting means to generate a speed error and correcting the estimated speed signal by the speed error.

In addition, a motor speed control apparatus of this invention comprises: a frequency generator for generating a frequency signal proportional to a rotating speed of a motor; a period detector for detecting a period of the frequency signal to output a mean speed signal proportional to a mean rotating speed of the motor; a controller for receiving an externally supplied speed command signal and a speed feedback signal and carrying out a control operation thereby to output a control signal; a corrector for correcting the control signal to output a corrected signal; a driver for supplying the motor with a driving current in accordance with the corrected signal; and a speed and load torque estimator for receiving the corrected signal and the mean speed signal, estimating a rotating speed of the motor and a load torque applied to the motor from the corrected signal to obtain an estimated speed signal and an estimated load torque signal, and outputting the estimated speed signal to the controller as the speed feedback signal and the estimated load torque signal to the corrector, respectively, wherein the speed and load torque estimator comprises a predictor for comparing the mean speed signal and an estimated mean speed signal obtained by integrating the estimated speed signal with respect to time to generate a mean speed error and generating a predicted value of an instantaneous speed error from the mean speed error, and a feedback loop for correcting the estimated speed signal by the predicted value generated by the predictor.

Still further, a motor speed control apparatus of this invention comprises: a frequency generator for generating a frequency signal proportional to a rotating speed of a motor, a period detector for detecting a period of the frequency signal to output a mean speed signal proportional to a mean rotating speed of the motor; a controller for receiving an externally supplied speed command signal and a speed feedback signal and carrying out a control operation thereby to output a control signal; a corrector for correcting the control signal to output a corrected signal; a driver for supplying the motor with a driving current in accordance with the corrected signal; and speed and load torque estimator for receiving the corrected signal and the mean speed signal, estimating a rotating speed of the motor and a load torque applied to the motor from the corrected signal thereby to obtain an estimated speed signal and an estimated load torque signal, and outputting the estimated speed signal to the controller as the speed feedback signal and the estimated load torque signal to the corrector, respectively, wherein the speed and load torque estimator comprises predicting means for generating a predicted value of an instantaneous speed from the mean speed signal, and a feedback loop for comparing the estimated speed signal and the predicted value generated by the predictor to generate a speed error and correcting the estimated speed signal by the speed error.

Also, a motor speed control apparatus of this invention comprises: a frequency generator for generating a frequency signal proportional to a rotating speed of a motor; a period detector for detecting a period of the frequency signal to output a mean speed signal proportional to a mean rotating speed of the motor; a controller for receiving an externally supplied speed command signal and a speed feedback signal and carrying out a control operation thereby to output a control signal; a corrector for correcting the control signal to output a corrected signal; a driver for supplying the motor with a driving currents in accordance with the corrected signal; and a speed and load torque estimator for estimating a rotating speed of the motor from the control signal to obtain an estimated speed signal to be outputted to the controller as the speed feedback signal, comparing the mean speed signal and an estimated mean speed signal obtained by integrating the estimated speed signal with respect to time to generate a mean speed error, and generating an estimated load torque signal from the mean speed error to be outputted to the corrector.

In addition, a motor speed control apparatus of this invention comprises: a frequency generator for generating a frequency signal proportional to a rotating speed of a motor; a period detector for detecting a period of the frequency signal to output a mean speed signal proportional to a mean rotating speed of the motor; a controller for receiving an externally supplied speed command signal and a speed feedback signal and carrying out a control operation thereby to output a control signal; a corrector for correcting the control signal to output a corrected signal; a driver for supplying the motor with a driving current in accordance with the corrected signal; and a speed and load torque estimator for estimating a rotating speed of the motor from the control signal to obtain an estimated speed signal to be outputted to the controller as the speed feedback signal, comparing the mean speed signal and an estimated mean speed signal obtained by integrating the estimated speed signal with respect to time to generate a mean speed error, and generating an estimated load torque signal from the mean speed error to be outputted to said corrector.

Further, a motor speed control apparatus of this invention comprises: a frequency generator for generating a frequency signal proportional to a rotating speed of a motor; a period detector for detecting a period of the frequency signal to generate a mean speed signal proportional to a mean rotating speed of the motor; a controller for receiving an externally given speed command signal and a speed feedback signal and carrying out a control operation thereby to output a control signal; a corrector for correcting the control signal to output a corrected signal; a driver for supplying the motor with a driving current in accordance with the corrected current; and a speed and load torque estimator for estimating a rotating speed of the motor from the control signal to obtain an estimated speed signal to be outputted to the controller as the speed feedback signal, generating a predicted value of an instantaneous speed of the motor from the mean speed signal, comparing the predicted value and the estimated speed signal to generate a speed error, and generating an estimated load torque signal from the speed error to be outputted to the corrector.

With constitutions as discussed above, the motor speed control apparatus of this invention can provide a speed estimating unit having a wide frequency band, so that the disturbance of load torque applied to the motor and the rotating speed can be estimated accurately up to higher frequency levels. As a result, the motor speed control apparatus of this invention makes it possible to reduce the speed change due to the disturbance of load torque stably up to higher frequency band levels through the speed control of the estimated rotating speed using the feedback signal. Besides, the speed change due to the disturbance of load torque can be further reduced through the feed forward compensation using the estimated load torque by the speed estimator.

Consequently, according to this invention, a motor speed control apparatus can be provided in which the controllable frequency band of the control system can be sufficiently enhanced with a comparatively simple structure even if the frequency generator equipped into the motor is low in output frequency and the rotational accuracy can be highly improved even if the disturbance of high frequency components of load torque is applied to the motor.

DESCRIPTION OF THE PREFERRED EMBODIMENTS

Figure 1:
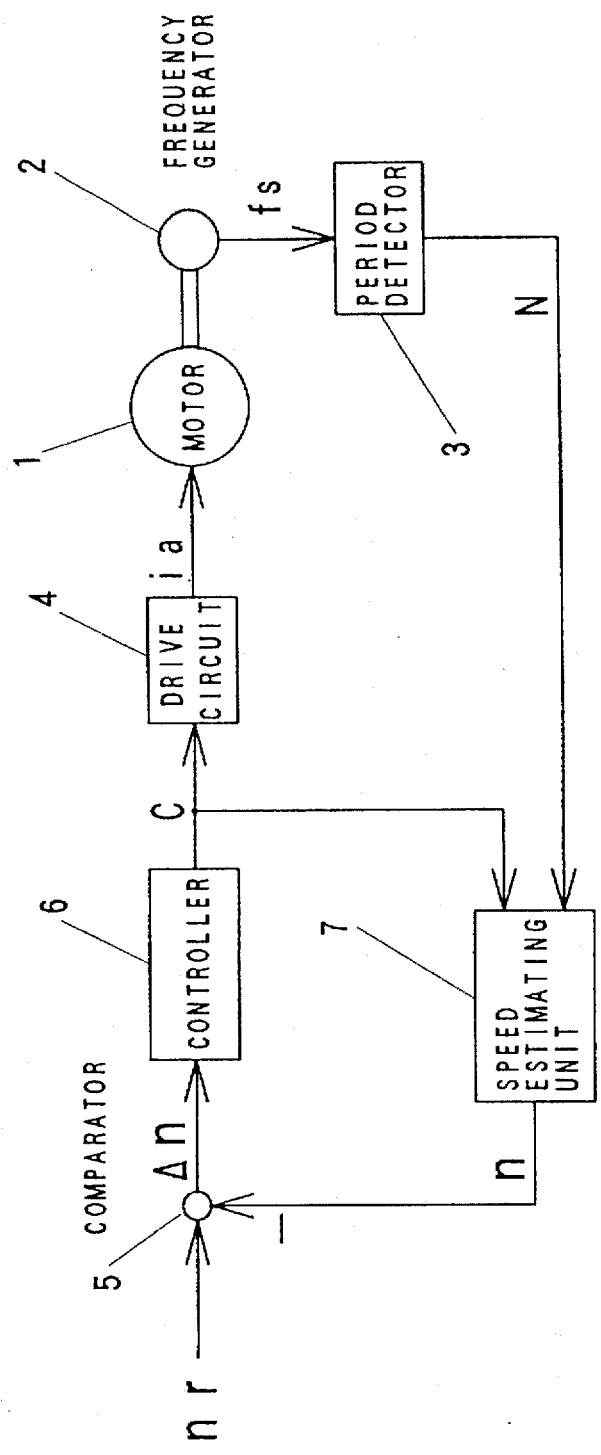
FIG. 1 is a block diagram of a speed control apparatus for a motor according a first embodiment of this invention.

A speed control apparatus for motors according to embodiments of this invention will be described below while referring to the drawings.

FIG. 1 is a block diagram of a speed control apparatus for motors according to a first embodiment of this invention. In FIG. 1, a motor 1 is driven by a driving current ia and generates a driving torque τm to be rotated and the rotation axis is applied with disturbance torque τm, a frequency generator 2 generates a frequency signal proportional to a rotating speed of the motor 1, a period detector 3 detects a period of the frequency signal fs in order to output a rotating speed signal N, a drive circuit 4 supplies the motor 1 with a driving current ia in accordance with a control signal C, a speed estimating unit 7 obtains a generated torque τm of the motor 1 in response to the control signal C supplied to the drive circuit 4 and detects an instantaneous rotating speed signal n' from the generated torque τm and the rotating speed signal N to be outputted to a comparator 5 which compares the instantaneous rotating speed signal Δn' and a rotating speed command signal nr (constant value) to output a deviation signal Δn, and a controller 6 applies the deviation n with control compensations such as proportional and integral compensations and outputs the control signal C.

With the structure as discussed above, the operation of the speed control apparatus for motors of this invention will be explained in detail.

In FIG. 1, for the case in which the rotating speed of the motor 1 is being invariably controlled, since the period of the frequency signal fs is inversely proportional to the rotating speed of the motor 1 in the vicinity of its operation point, the output of the period detector 3 is made the detected rotating speed.

Namely, the rotating speed of the motor 1 is sampled by the period of the frequency signal fs of the period generator 2 and the detection result is held only for the period described. As a result, the detection result of rotating speed of the motor 1 does not show an instantaneous value of the rotating speed at the point when sampling, but shows a mean value of the rotating speed for the period of the frequency signal fs, thus having a detection time delay.

The speed estimating unit 7 estimates the instantaneous rotating speed during the time where the frequency signal fs outputted from the frequency generator 2 is not varied (where the zero-crossing point of signal is not detected) using the generated torque τm (=kt.ia=kt.gm.c; where kt is a torque constant of the motor 1 and gm is a transform constant of the drive circuit 4), which is generated in accordance with the control signal C outputted from the controller 6, and the detected mean speed value N outputted by the period detector 3. Here, the estimated value of rotating speed can be obtained, as expressed in equation (3), by integrating the deviation between the generated torque τm of the motor 1 generated in accordance with the control signal C and the estimated load torque τm applied to the motor 1 divided by the rotor inertia Jn of the motor with respect to time.

As a result, the load torque τm is required to be estimated, however, a conventional speed control apparatus estimates the load torque τm by simply proportionally integrating the deviation between the mean speed detection value N of the period detector 3 and the mean value N' of the estimated speed n'. Thus, the speed detection delay is reduced by estimating the instantaneous speed n from the estimated load torque τd' and the generated torque τm' of the motor 1 in accordance with the 3 control signal C. Furthermore, the comparator 5 and the controller 6 control the rotating speed of the motor 1 with the instantaneous rotating speed n' estimated by the speed estimating unit 7 in response to the speed command signal nr as the feedback signal.

Next, the speed estimating unit 7 as a member of the speed control apparatus for motors of this invention will be explained in detail below.

Figure 2:
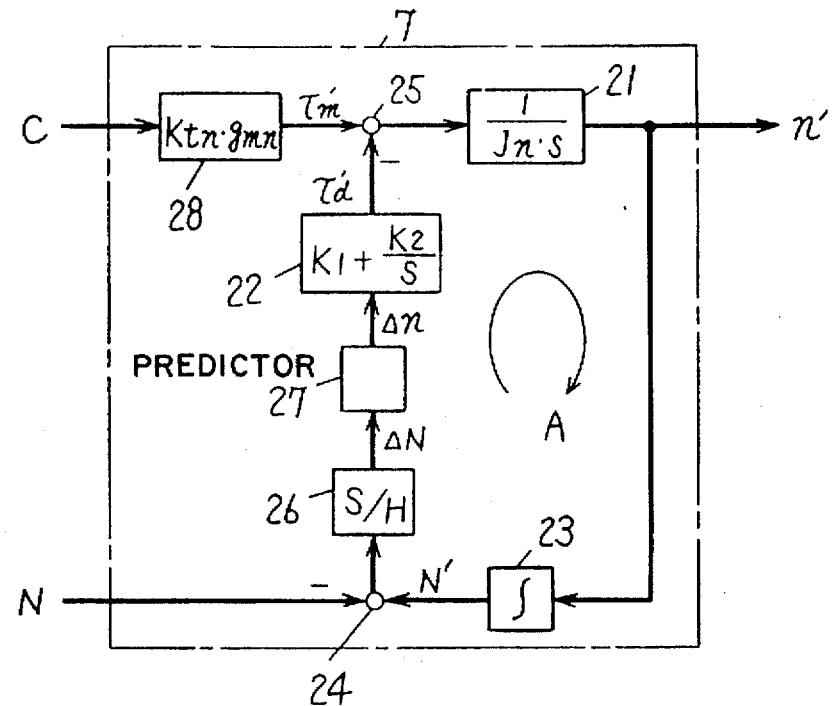
FIG. 2 is a block diagram showing an example of a speed estimating unit as a member of the apparatus shown in FIG. 1.
Figure 15:
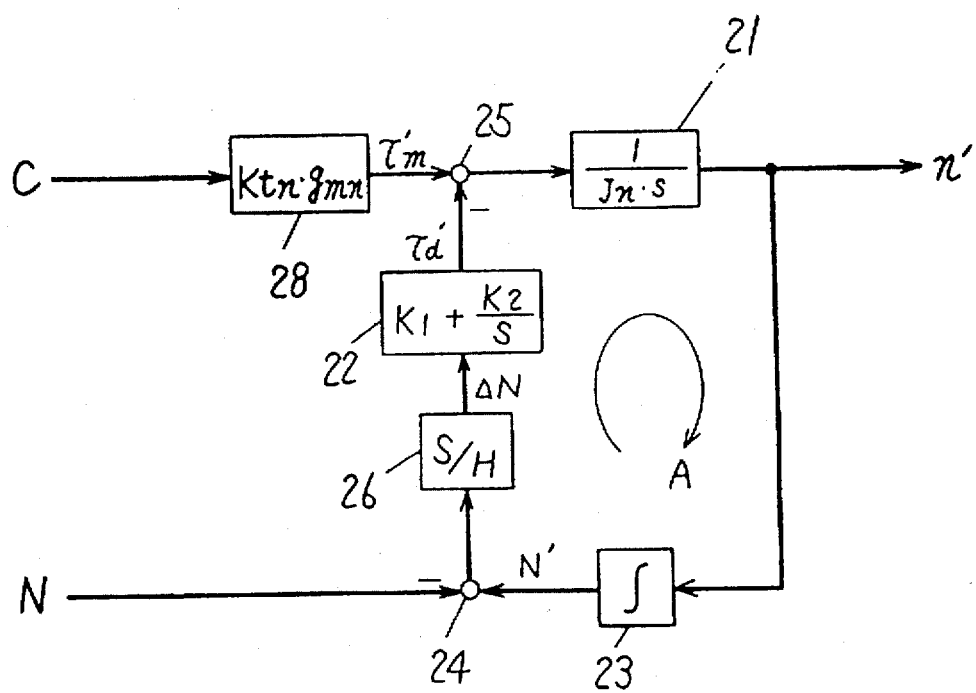
FIG. 15 is a block diagram of a speed estimating unit in the prior art.

FIG. 2 is a block diagram of the speed estimating unit 7 shown in FIG. 1. In addition, the corresponding elements having the same functions as those of the conventional speed estimating unit shown in FIG. 15 and are denoted by the same reference numerals and their explanations will be omitted. The speed estimating unit 7 as shown in FIG. 2 and the conventional speed estimating units shown as in FIG. 15 are different in that with the conventional unit shown in FIG. 15, the output of a sample and holder 26 is directly sent to a proportional integral compensator 22, but with the speed estimating unit 7 as shown in FIG. 2, the output of the sample and holder 26 is input through a predictor 27 to the proportional integrated compensator 22.

With the above-mentioned structure, the operation of the speed control apparatus of this invention will be explained in detail by referring to the drawings.

Figure 3:
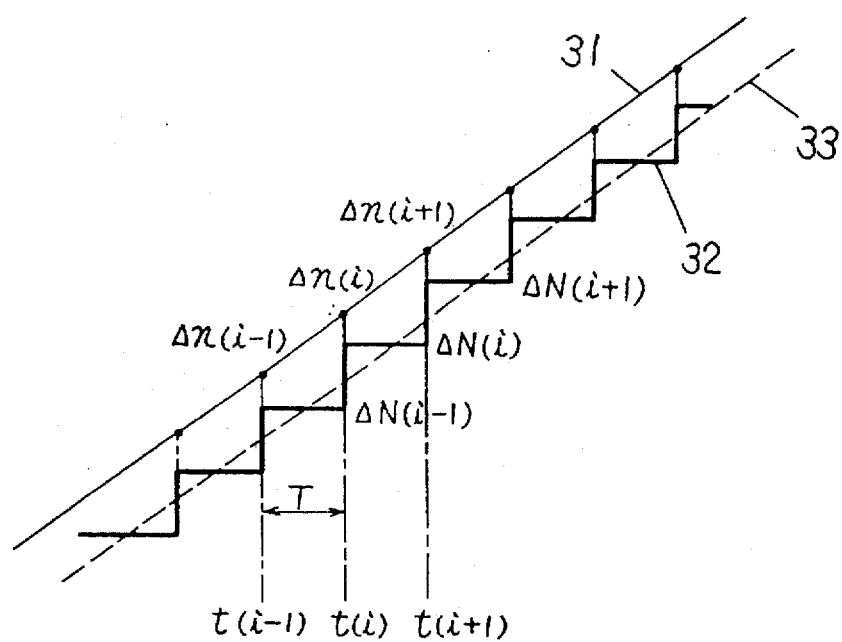
FIG. 3 is a waveform diagram for explaining the operation of a predicting circuit according to this invention.

FIG. 3 is an explanatory diagram for the operation of the predictor 27 as a member of the speed estimating unit 7 shown in FIG. 2, in which the relation between the speed deviation ΔN (=N'−N) between the estimated mean rotating speed N' obtained through the speed estimating unit 7, and the 'mean rotating speed N generated by the period detector 3, and the speed deviation Δ' (=n'−n) between the estimated rotating speed n' (instantaneous value) and the actual rotating speed n (instantaneous value) of the motor is shown on a waveform basis. In FIG. 3, the reference numeral 31 denotes the speed deviation Δn (instantaneous value), which is changed as shown in the diagram. Reference numeral 32 is the mean rotating speed deviation ΔN, which is sampled by the frequency signal fs of the frequency generator 2 and obtained during the period T. The mean rotating speed deviation ΔN is, as seen in FIG. 3, is changed in steps at time points t (i−1), t(i), t(i+1) . . . with the period T of the frequency signal fs, thus holding it constant during the period T. The dotted line 33 shows a rotating speed of the motor 1 estimated from the mean rotating speed deviation ΔN shown at 32, which has a detection time delay of about T compared with the rotating speed deviation ΔN of the motor as clearly seen in FIG. 3. Accordingly, as shown in FIG. 15, showing if the conventional speed estimating unit is if structured such that the mean rotating speed deviation ΔN is sent through the sample and holder 22 to the proportional integral compensator 22 for processing, the control frequency band cannot be increased in order so as to stabilized the control system of loop A as shown in FIG. 15 due to the above-mentioned detection time delay. On the other hand, the speed estimating unit 7 shown in FIG. 2 operationally estimates the instantaneous rotating speed deviation ΔN of the motor from the mean rotating speed deviation ΔN and sends the estimated value to the proportional integral compensator 22 for processing, such that the control frequency band can be set independently of the detection time delay.

In FIG. 3 the following equation (4) may be obtained between the instantaneous rotating speed deviation n and the mean rotating speed deviation ΔN as $$\frac{\Delta n(i) + \Delta n(i-1)}{2} = \Delta N(i) \quad (4)$$

Therefore, by rearranging the above equation (4), the following equation (5) results:

$$\Delta n(i) = 2 \cdot \Delta N(i) - \Delta n(i-1) \quad (5)$$

Figure 4A:
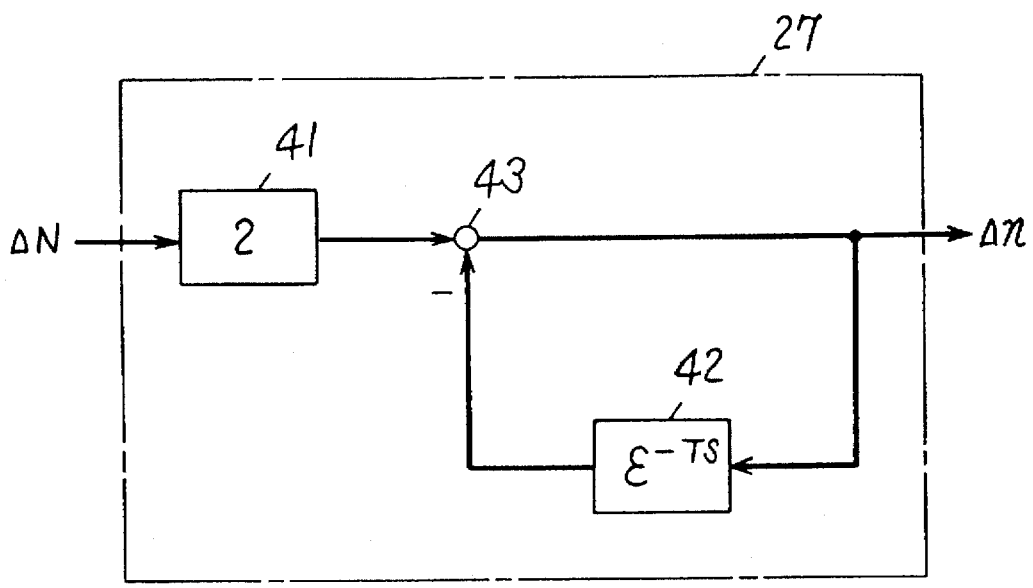
FIG. 4 is a block diagram of a predicting circuit according to this invention.
Figure 4B:
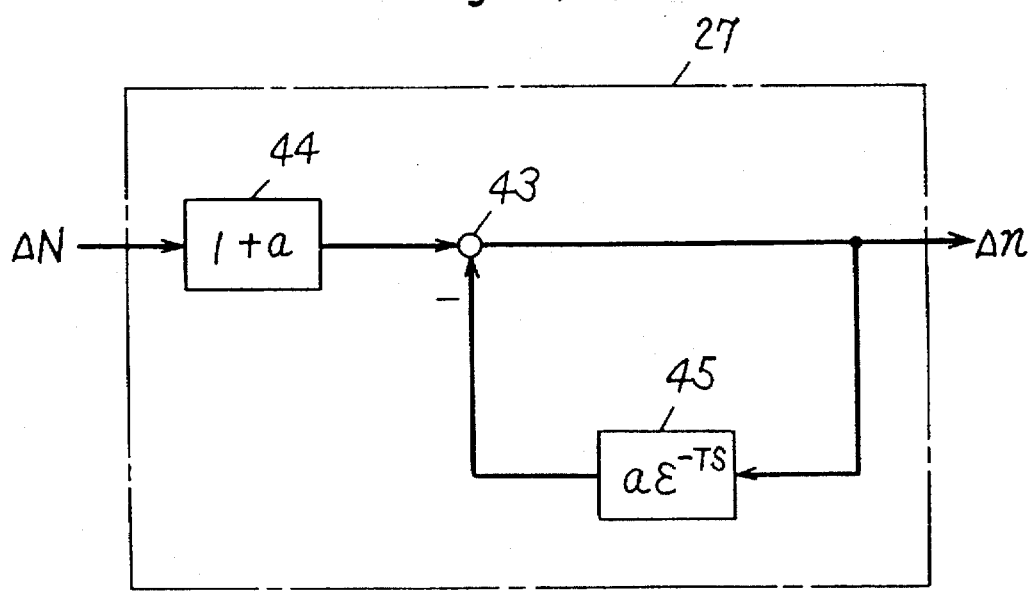

FIG. 4 shows equation (5) by means of the block diagram, showing a block diagram of the predictor 27 as a member of the speed estimating unit 7. At (a) of FIG. 4, 41 is a multiplier with a constant of 2, 42 is a delay circuit to delay only one sampling period T (in this case, the period of the frequency signal fs of the frequency generator 2), and 43 is a subtracter for subtracting the rotating speed deviation, Δn (i−1) obtained by the preceding operation of one sampling period T from the mean rotating speed deviation 2−ΔN(i) doubled through the multiplier 41. The operation results of the subtracter 43 shows the rotating speed deviation Δn(i) obtained by the equation (5).

Namely, the predictor 27 makes it possible to obtain the instantaneous rotating speed deviation ΔN of the motor when sampling at the present time from the mean rotating speed deviation ΔN when sampling at the present time.

Figure 5A:
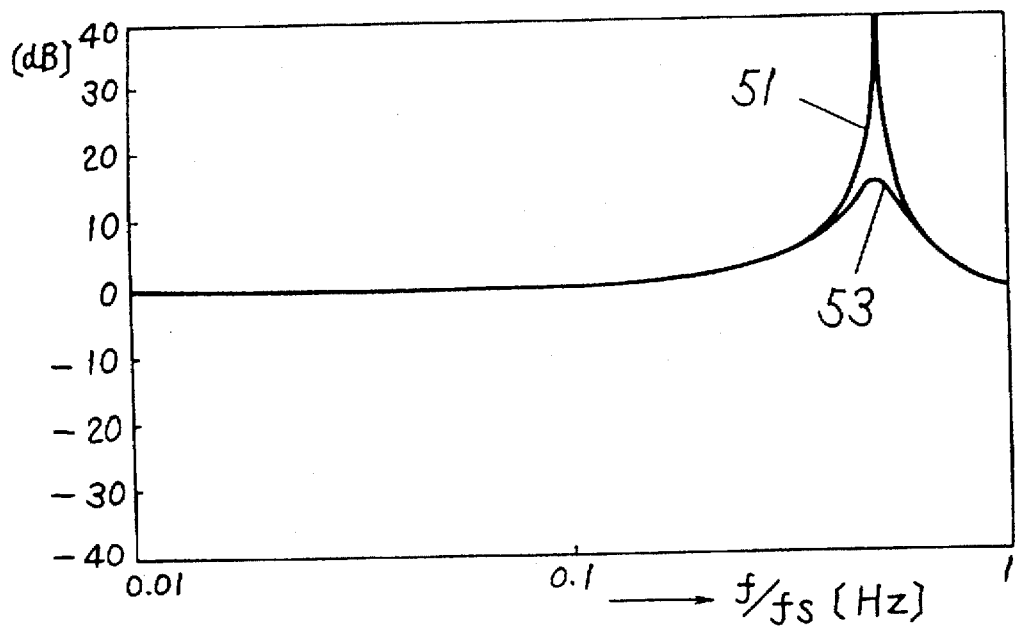
FIG. 5 is a Bode diagram.
Figure 5B:
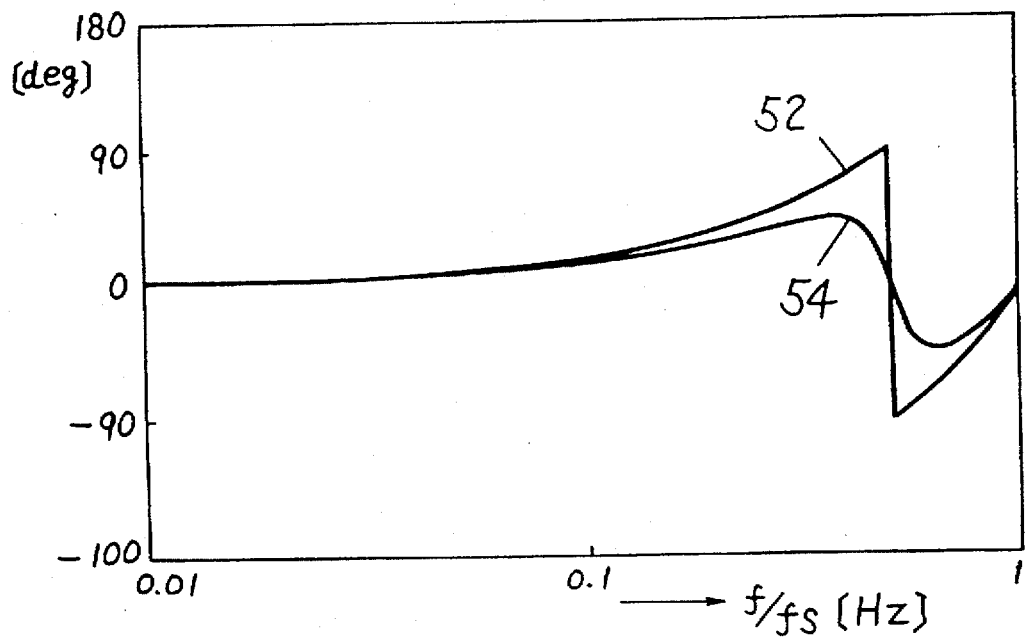

FIG. 5 is a Bode diagram showing the transmission characteristics from the mean rotating speed deviation ΔN to the instantaneous rotating speed deviation Δn of the block diagram of the predictor 27 at (a) of FIG. 4.

At (a) of FIG. 5, the reference numeral 51 denotes the amplitude characteristic of the block diagram shown at (a) of FIG. 4, and 52 at (b) of FIG. 5 is the phase characteristic of the block diagram shown at (a) of FIG. 4.

The abscissas of FIG. 5 are normalized based on the sampling frequency fs (equal to the frequency of a frequency signal outputted from the frequency generator 2). As seen from 52 at (b) of FIG. 5, the process of the predictor 27 shown in the block diagram of (a) of FIG. 4 characterizes the phase leading, but as seen from 51 at (a) of FIG. 5, the control system is unstable (the amplitude characteristic becomes infinite at frequency fs/2) and becomes unpractical. As a result, in order to stabilize the control system practically, the block diagram shown at (b) of FIG. 4 is used instead of that shown at (a) of FIG. 4. In this case, however, the coefficient α at (b) of FIG. 4 is selected so as to be 0<α<1. The amplitude characteristic when the coefficient is α made 0.7 in the block diagram shown at (b) of FIG. 4 is shown at 53 at (a) of FIG. 5 and the phase characteristic thereof is shown at 54 at (b) of FIG. 5. By selecting α so as to be smaller than one, the control system of the predictor 27 can be stabilized and the phase leading characteristic can be obtained in the frequency range below fs/2.

By including the predictor 27, having the phase leading characteristic that is shown above, into the loop A of the speed estimating unit 7, one kind of differential compensation can be applied to the phase delay such that the mean rotating speed deviation ΔN itself resembles that as explained in reference to FIG. 3. As a result, it becomes possible to set larger the constants K1 and K2 of the proportional integral compensator thus being capable of expanding the control frequency band of the loop A.

As described in the embodiment above, the frequency band of the loop A of the speed estimating unit can be made larger than that in the prior art and the load torque disturbance applied to the motor can be estimated up to higher frequency levels, so that the speed estimating unit 7 makes it possible to estimate the estimated rotating speed n' accurately up to higher frequency band levels.

Consequently, the speed control apparatus for motors of this invention performs the speed control with the estimated rotating speed n' as the feedback signal, so that the speed change due to the disturbance of load torque can be stably reduced up to higher frequency band levels.

Figure 6:
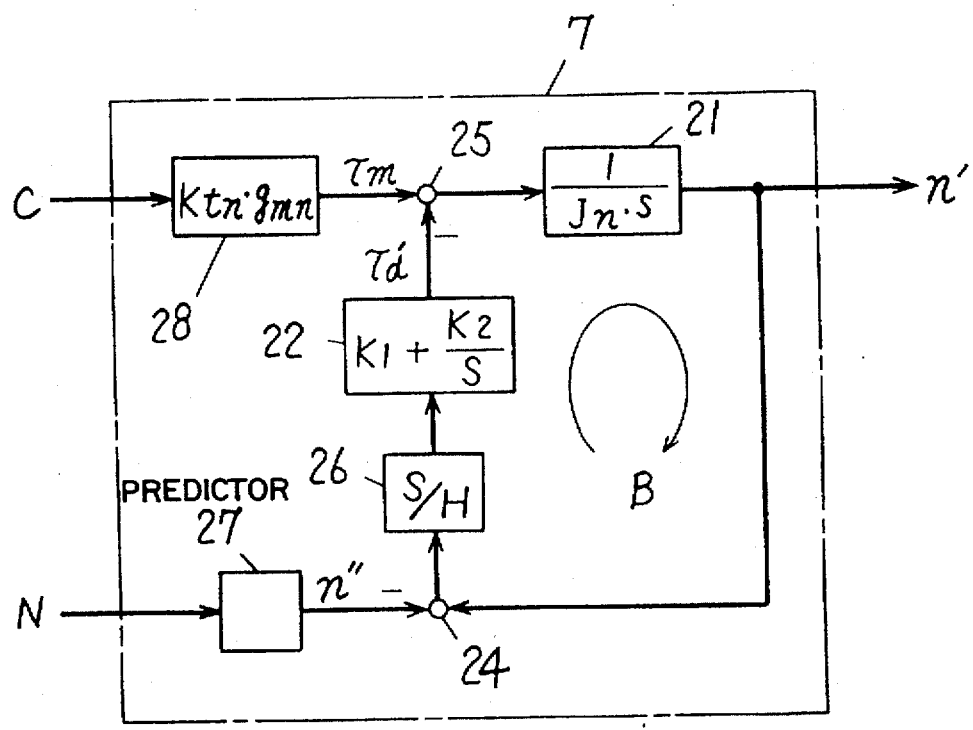
FIG. 6 is a block diagram showing another example of a speed estimating unit as a member of the apparatus shown in FIG. 1.

FIG. 6 is a block diagram showing another example of the speed estimating unit 7. In FIG. 6, the elements having the same functions corresponding to those of the speed estimating unit 7 according to this invention as shown in FIG. 2, are denoted with the same reference numerals and their explanations will be omitted.

This example is different in structure from that as shown in FIG. 2. In FIG. 2, the integrator 23 is inserted into the loop A, but in the case of the speed estimating unit 7, as shown in FIG. 6, the integrator 23 is not implemented and the estimated rotating speed n' as an output of the integrator 21 is directed to the comparator 24. On the other hand, the mean rotating speed N generated by the frequency generator 3 is sent through the predictor 27 to the comparator 24 to be applied with the subtraction and is then sent successively to the sample and holder 26 and the proportional integral compensator 22 for processing. The integrator 21, comparator 24, proportional integral compensator 22, and subtracter 25 form a loop B.

Figure 14:
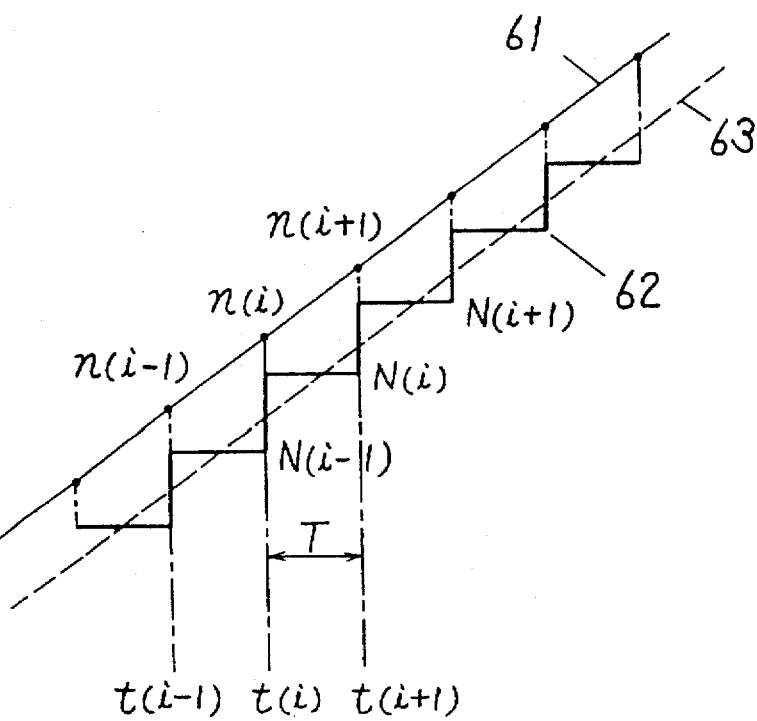
FIG. 14 is a waveform diagram showing a relation between an instantaneous rotating speed n and a mean rotating speed N of a motor.

In another example as described above, the operation of the speed control apparatus of this invention will be explained in detail by referring to the drawings. The operation of the predictor 27 will be explained by referring to FIG. 14 already mentioned above. FIG. 14 is a waveform diagram showing the relation of the mean rotating speed N generated by the frequency generator 3 and the actual rotating speed n (instantaneous value) of the motor, and such relation may be represented by equation (6) as follows:

$$\frac{n(i) + n(i-1)}{2} = N(i) \tag{6}$$

Therefore, by rearranging the equation (6), $$n(i)=2 \cdot N(i) - n(i-1) \tag{7}$$

Namely, the instantaneous rotating speed n can be predicted from the mean rotating speed N by operation using equation (7).

The predicted rotating speed n" thus obtained and the estimated rotating speed n' are compared by the comparator 24. The operation of equation (7) can be performed in the same way as that of the predictor 27 as shown in FIG. 2 as well as is realizable by the operation expressed in the block diagram of FIG. 4. As a result, their explanations will be omitted for avoiding duplication.

In another example of the speed estimating unit 7 shown in FIG. 6, the integrator 23 generating phase delay is not included in the loop B, and the constants K1 and K2 of the proportional integral compensator 22 can be set large compared with the speed estimating unit 7 shown in FIG. 2. As a result, the loop B shown in FIG. 6 can be further expanded in control frequency band compared with the loop A shown in FIG. 2.

According to the example shown in FIG. 6, as discussed above, the frequency band of the loop B of the speed estimating unit 7 can be expanded and the load torque disturbance applied to the motor can be estimated up to higher frequency levels, so that the speed estimating unit 7 can estimate the estimated rotating speed n' accurately up to higher frequency levels. In addition, the example shown in FIG. 6 does not need the integrator 23 that is required in FIG. 2, so that the speed estimating unit 7 can be made simple in structure.

Figure 7:
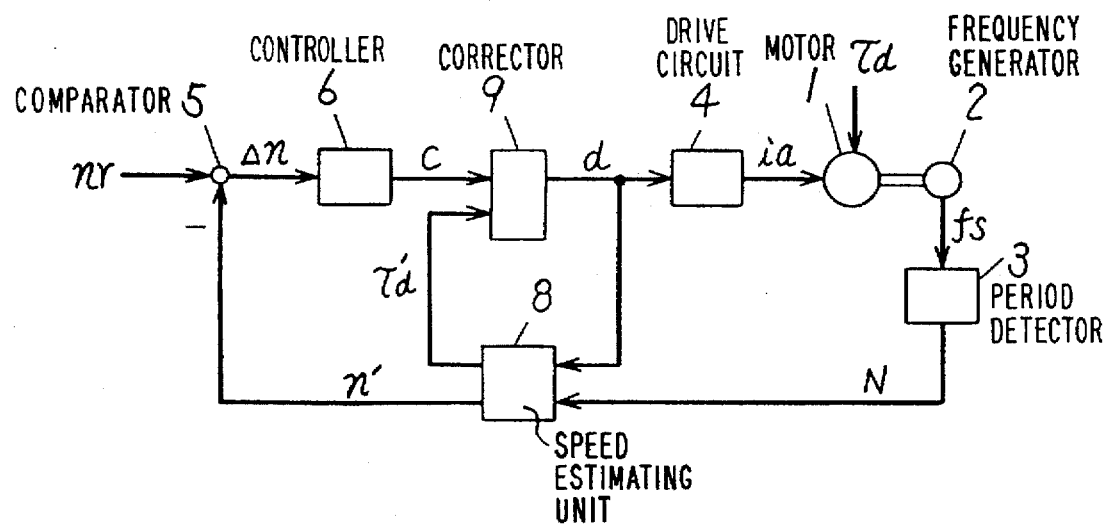
FIG. 7 is a block diagram of a speed control apparatus for motors according to a second embodiment of this invention.

FIG. 7 is a block diagram of a speed control apparatus for a motor according to a second embodiment of this invention. In this case, the elements having the same functions as those in FIG. 1 will be denoted with the same reference numerals and their explanations will be omitted.

The second embodiment shown in FIG. 7 is different in from the first embodiment shown in FIG. 1 in that structure in the case of the first embodiment, the output of the speed unit 7 is only the estimated rotating speed n' and supplies it to the comparator 5, however, in the case of the second embodiment as shown in FIG. 7, the estimated load torque τd' obtained by operation through a speed estimating unit 8 is used for performing feed forward compensation with the control signal C outputted from the controller 6. The reference numeral 9 denotes a corrector which receives the control signal C from the controller 6 and the estimated load torque τd' from the speed estimating unit 8, operates the compensation and outputs a corrected signal d to the drive circuit 4.

With the structure described shown above, the operation of the speed control apparatus for a motor according to the second embodiment will be explained in detail by referring to the drawings.

Figure 8:
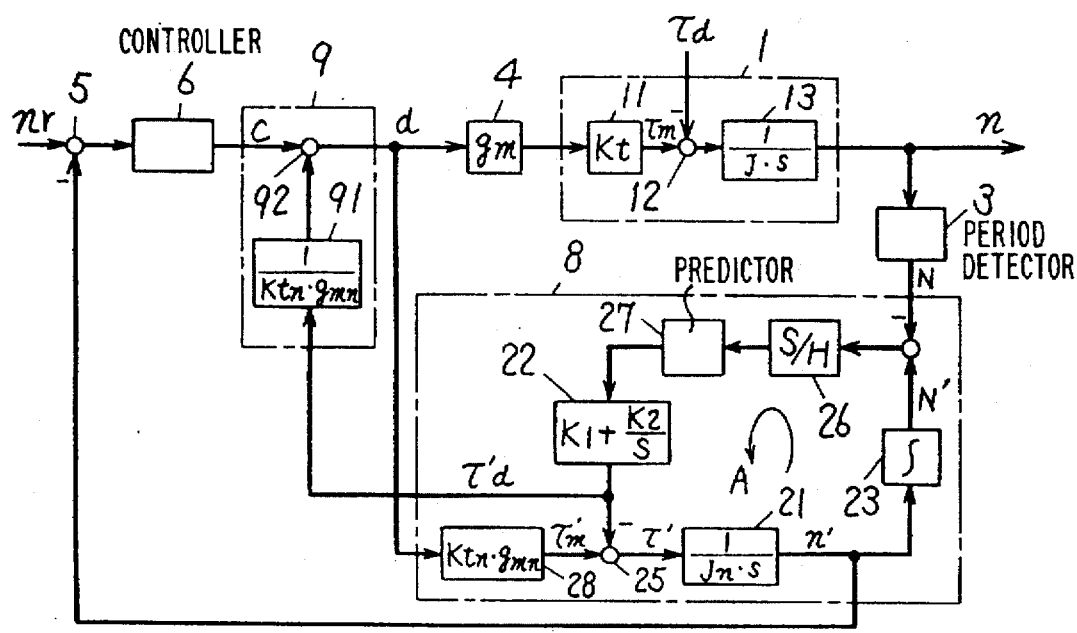
FIG. 8 is a entire block diagram showing the operation of an example of the apparatus shown in FIG. 7.

FIG. 8 is the entire block diagram for showing the operation of the speed control apparatus for the motor as shown in FIG. 7. In FIG. 8, reference numeral 1 is a block diagram of the motor and 8 is a block diagram of the speed estimating unit according to the second embodiment, which is different from the speed estimating unit 7 according to the first embodiment in that it outputs both the estimated rotating speed n' and the estimated load torque τd' obtained by internal operation, and the estimated rotating speed n' is sent to the comparator 5 to be used as the feedback signal for speed control. On the other hand, the estimated load torque τd' is sent to the corrector 9 which comprises a multiplier 91 for multiplying a constant 1/(ktn·gmn) to be outputted and an adder 92 for adding the operation result of the multiplier 91 to the control signal C from the controller 6 to be outputted to the drive circuit 4 (transform constant is gm) as the corrected signal.

Next, the operation of the speed control apparatus according to the second embodiment will be explained in detail. Also, referring to the speed estimating unit 8, the elements having the same functions as those of the speed estimating unit 7 shown in FIG. 2 are denoted with the same reference numerals and their explanations will be omitted.

In FIG. 8, the corrected signal d can be expressed as $$d = c + \frac{\tau d'}{Ktn \cdot gmn} \tag{8}$$

follows:

As a result, the generated torque τm of the motor 1 can be expressed by multiplying the transform constant gm of the drive circuit 4 by the torque constant kt of the motor 1, or $$\begin{aligned}\tau m &= Kt \cdot gm \cdot d \\ &= Kt \cdot gm \cdot c + \tau d'\end{aligned} \tag{9}$$

where, for the sake of simplification, ktn=kt and gmn=gm are assumed.

Then, the estimated load torque τd' outputted from the speed estimating unit 8 is equal to the load torque applied to the motor 1 in the frequency range not exceeding the control frequency band of loop A, so that the actual load torque τd and the estimated load torque canceled each other out through the adder 12 as a component of the block diagram 1 of the motor. Namely, by applying the feed forward compensation to the estimated load torque τd' through the corrector 9, the motor 1 behaves as if the disturbance of the load torque is not applied to a transfer function 13 (its coefficient is 1/Js). Accordingly, the motor 1 can be driven at a high rotation accuracy without receiving any influence from the load torque disturbance on a practical basis.

According to the second embodiment shown in FIG. 7, the frequency band of the loop A of the speed estimating unit 8 can be expanded by providing the predictor 27, and the load torque disturbance τd applied to the motor 1 can be estimated up to higher frequency levels. As a result, the speed estimating unit 8 can estimate the estimated rotating speed n' accurately up to higher frequency levels.

Consequently, the speed control apparatus according to the second embodiment of this invention performs speed control using the estimated rotating speed n' obtained by the speed estimating unit 8, so that the speed change due to the load torque disturbance can be stably reduced up to higher frequency band levels. In addition, by applying the feed forward compensation to the estimated load torque τd' through the corrector 9, the load torque τd applied to the motor 1 can be canceled, so that the speed change due to the load torque disturbance of the motor can be further reduced.

The speed estimating unit 8 is structured based on that as shown in FIG. 2 as clearly from the block diagram shown in FIG. 8.

Figure 9:
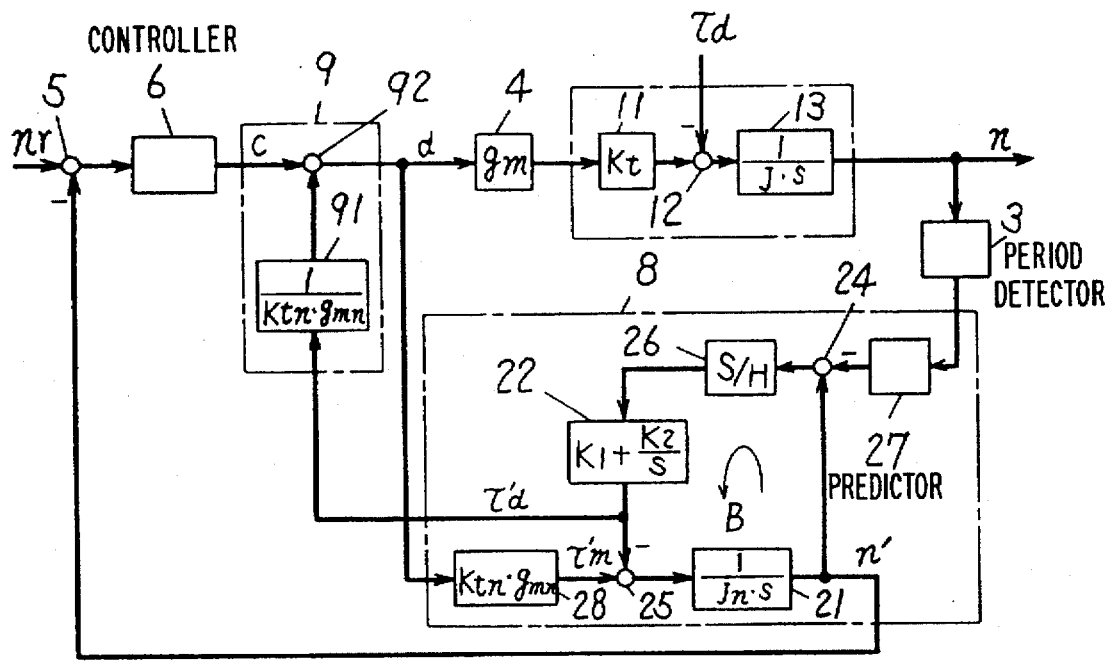
FIG. 9 is an entire block diagram showing the operation of another example of the apparatus shown in FIG. 7.

FIG. 9 is a block diagram showing another example of the speed estimating unit 8 of the second embodiment based on the structure shown in FIG. 6. In FIG. 9, the elements having the same functions as those shown in FIGS. 6 and 8 are, denoted by the same reference numerals and their explanations are omitted.

In the case of FIG. 9, the control frequency band of the loop B of the speed estimating unit 8 can be expanded, so that the same effects as with the example shown in FIG. 8 can be obtained. Further, in the case of FIG. 9, there is no need for the integrator 23 such as in the case of the example shown in FIG. 8, so that the speed estimating unit can be made simpler in structure.

From the above descriptions, it can be realized that the speed control apparatus for motors according to the second embodiment of this invention makes it possible to stably reduce the speed change due to the disturbance of load torque up to higher frequency band levels by performing the speed control using the estimated rotating speed n' obtained by the speed estimating unit 8 and to cancel the load torque τd applied to the motor 1 by feed forward-compensating the estimated load torque τd' by the corrector 9, so that the speed change of the motor due to the load torque disturbance can be reduced.

As described above, according to the second embodiment of this invention, such a speed control apparatus for motors that is extremely small in speed change due to the disturbance of load torque can be provided.

Figure 10:
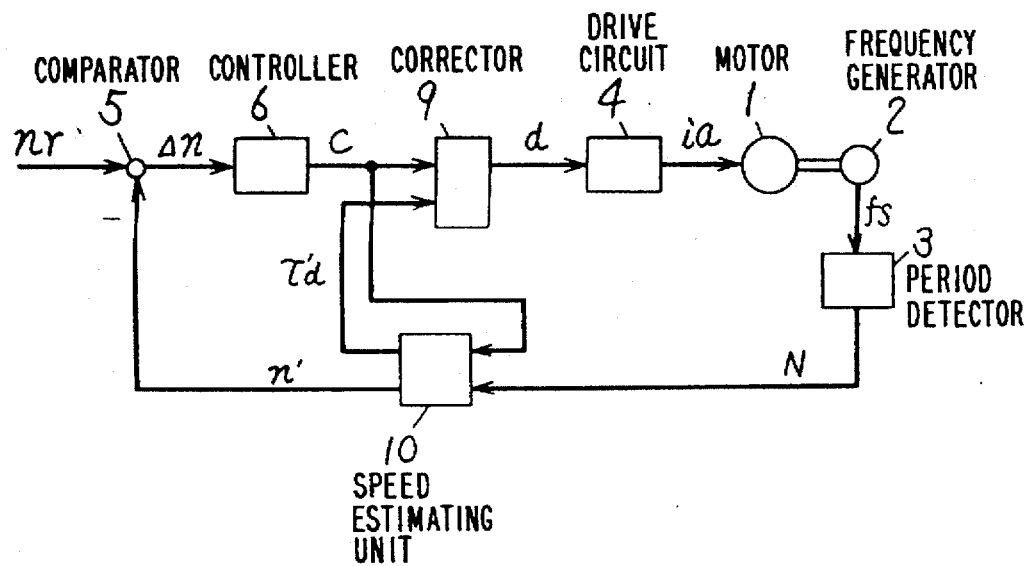
FIG. 10 is a block diagram of a speed control apparatus for motors according to a third embodiment of this invention.

FIG. 10 is a block diagram of a speed control apparatus for motors according to a third embodiment of this invention. In FIG. 10, the elements having the same functions as those shown in FIGS. 1 and 7 are denoted at the same reference numerals and their explanations are omitted.

The unit shown in FIG. 10 is different from that shown in FIG. 7 in that in the case of FIG. 7, the speed estimating unit 8 receives the corrected signal d outputted from the corrector 9 as its input, but in the case of FIG. 10, the speed estimating unit 10 receives the control signal c outputted from the speed controller 6 as its input. The estimated load torque τd' estimated by the speed estimating unit 10 is sent to the corrector 9. After passing through the corrector 91 the corrected signal d thus obtained is sent to the drive circuit 4.

The operating of the speed control apparatus for motors according to the third embodiment of this invention structured as described above will be explained in detail while referring to the drawings.

Figure 11:
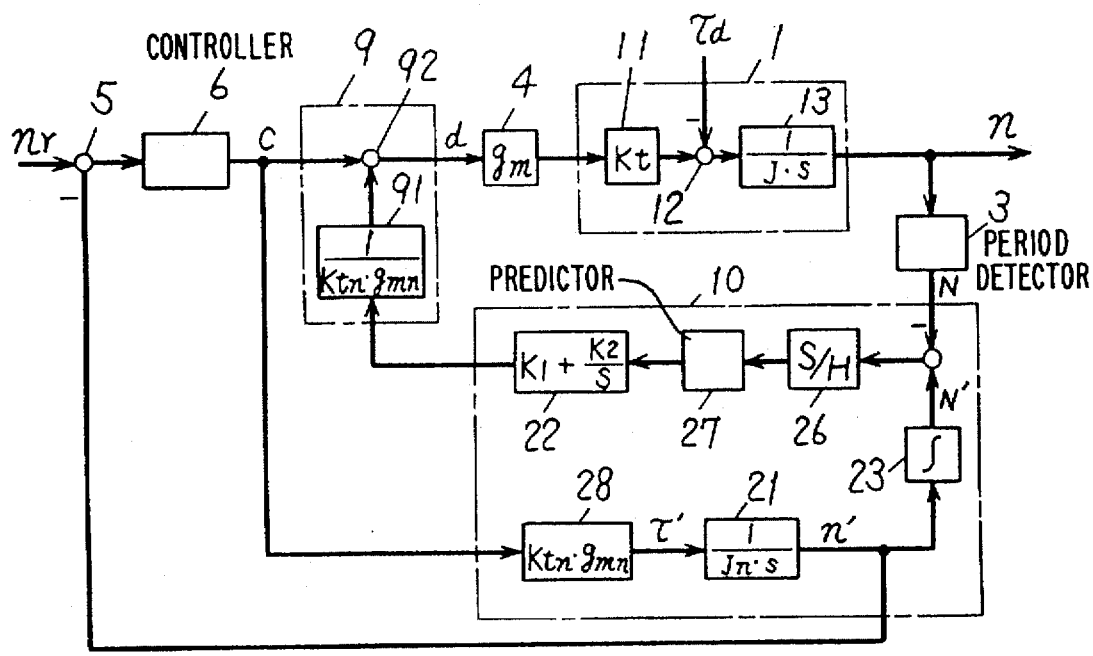
FIG. 11 is an entire block diagram showing the operation of an example of the apparatus shown in FIG.10.

FIG. 11 is an entire block diagram for explaining the speed control apparatus for a motor as shown in FIG. 10. In FIG. 11, the elements having the same functions as those shown in FIG. 8 are denoted by the same reference numerals and their explanations are omitted.

In FIG. 11, 10 is a block diagram of the speed estimating unit according to the third embodiment, in which the subtracter 25 is not needed. On the other hand, the speed estimating unit 8 according to the second embodiment as shown in FIG. 8, needs the subtracter 25 for subtracting the estimated load torque τd' from the estimated generated torque τd' obtained by multiplying the corrected signal d by the constant (Ktn·gmn) of the multiplier 28, thereby obtaining the signal τ' which is sent to the integrator 21.

With the structure as described above, the operation of the speed control apparatus for motors according to the third embodiment will be explained in detail.

First, the estimated acceleration torque τ as the input of the input of the integrator 21 of the speed estimating unit 8 shown in FIG. 8 may be expressed as follows:

$$\tau' = \tau m' - \tau d' \quad (10)$$
$$= Ktn \cdot gmn \cdot d - \tau d'$$

However, the corrected signal d of the corrector 9 may be expressed as follows:

$$d = c + \frac{\tau d'}{Ktn \cdot gmn} \quad (11)$$

Therefore, from equations (10) and (11), the estimated acceleration torque τ may be obtained as follows;

$$\tau' = Ktn \cdot gmn \cdot c \quad (12)$$

By modifying the structure of the speed estimating unit 8 as shown in FIG. 8 based on equation (12), the structure of the speed estimating unit 10 shown in FIG. 11 may be obtained. That is, the control signal c of the controller 6 is sent to the multiplier 28 to be multiplied by the constant (Ktn−gmn) thereby obtaining the estimated acceleration torque τ'. The estimated acceleration torque τ is sent to the integrator 21 to be multiplied by the constant $$\frac{1}{Jn \cdot s},$$

thereby obtaining the estimated rotating speed n'. On the other hand, the estimated load torque τd' is sent to the corrector 9 and similar to the case of FIG. 8, the estimated load torque τd' outputted from the speed estimating unit 10 is equal to the load torque τd applied to the motor 1, so that the actual load torque τd and the estimated load torque τd' canceled each other out through the adder 12.

As a result, similar to the case of the second embodiment shown in FIG. 8, the motor 1 can be driven at a high rotation accuracy.

As explained above, according to this embodiment, the estimated load torque τd' applied to the motor and the estimated rotating speed n' can be estimated up to higher frequency band levels with simpler structure than that shown in FIG. 8.

As a result, the speed control apparatus for motors according to the third embodiment of this invention makes it possible to stably reduce the speed change due to the disturbance of load torque up to higher frequency band levels by speed-controlling using the estimated rotating speed n' obtained by the speed estimating unit 10 and cancelling the load torque τd applied to the motor 1 by feedforward-compensating the estimated load torque τtd' by the corrector 9, so that the speed change due to the load torque disturbance of the motor can be further reduced.

In addition, in FIG. 11, by feedforward-compensating the estimated load torque τd' by the corrector 9, the load torque τd applied to the motor 1 can be canceled, so that even if the predictor 27 is not particularly included into the speed estimating unit 10, the speed change due to the load torque disturbance of the motor can be satisfactorily reduced, thus eliminating problems on a practical basis.

As is clear from the block diagram shown in FIG. 11, the structure of the speed estimating unit 10 is based on that as shown in FIG. 2.

Figure 12:
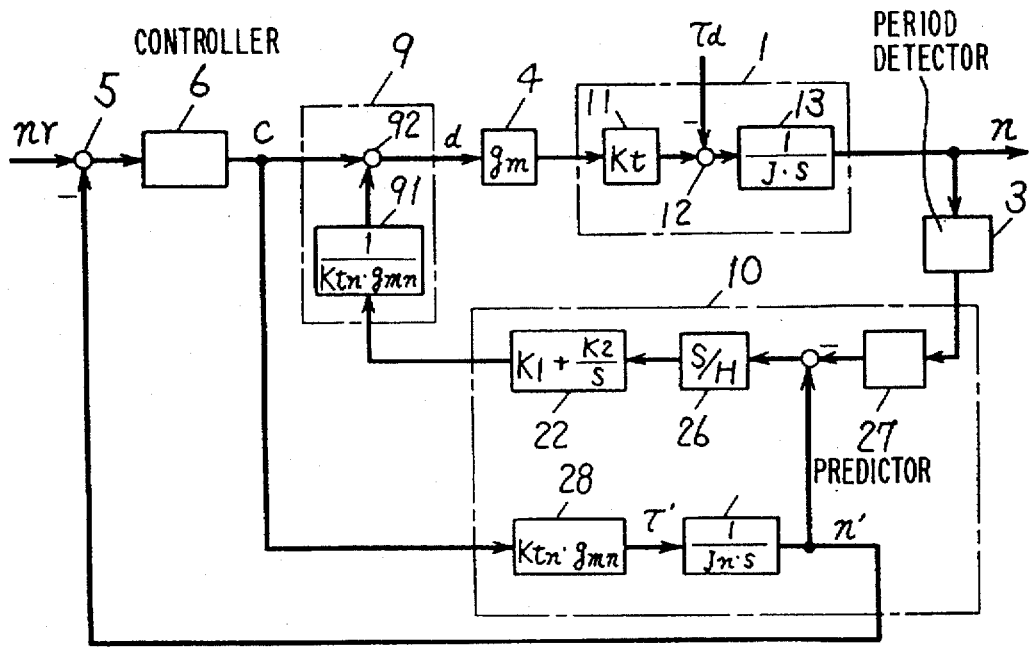
FIG. 12 is an entire block diagram showing the operation of another example of the apparatus shown in FIG. 10.
Figure 13:
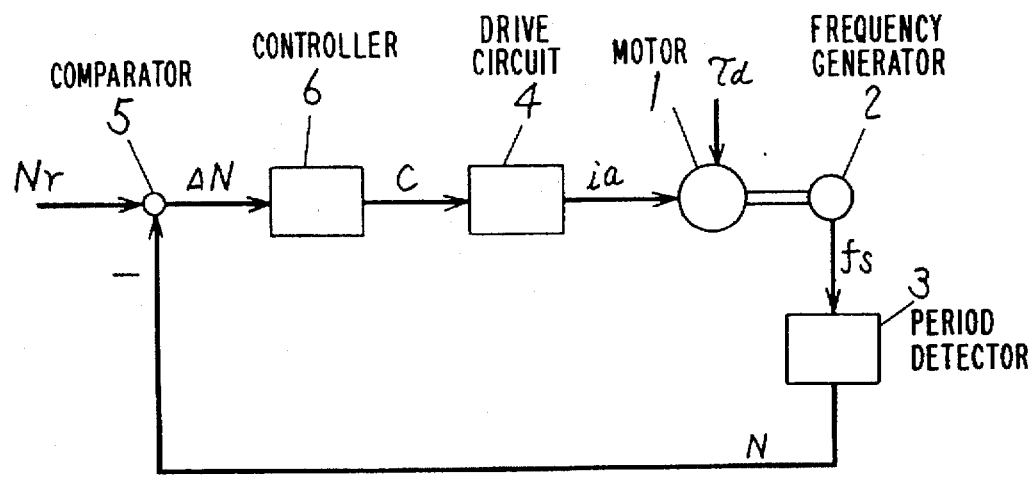
FIG. 13 is a block diagram of a speed control apparatus for motors in the prior art.

FIG. 12 is a block diagram showing another example of the speed estimating unit 10 according to the third embodiment, the structure of which is based on the structure of the unit as shown in FIG. 6. In FIG. 12, the elements having the same functions as those shown in FIGS. 6 and 11 are denoted by the same reference numerals and their explanations are omitted.

With the structure as shown in FIG. 12, the same effects as with the structure as shown in FIG. 11 can be obtained. In addition, in the case, of the example shown in FIG. 12, there is no need to use the integrator 23 that is required for the example shown in FIG. 11, thus the speed estimating unit 10 is able to be simpler in structure.

According the third embodiment of this invention as explained above, such a speed control apparatus for motors that the speed change due to the disturbance of load torque is extremely small can be provided.

Furthermore, in the first, second and third embodiments of this invention, the speed estimating unit receives the control signal from the controller as its input signal, however, it is needless to say that even if the driving current outputted from the drive circuit is used instead of the control signal, the same effects can be obtained.

In addition, the integrator 21 and the proportional integral compensator 22 were explained above so as to be made of analog filters, but they are not limited in this respect, for example, they may be made of digital filters. Further in addition, each of the members forming the control apparatus may be realized using software for micro-computers.

Also, the controlled output signal of each member in the above embodiments was explained as a continuous signal, but is not limited in this respect, for example, it may be outputted as a discrete signal, and if the output sampling period is made sufficiently shorter than the period of an output frequency signal of the frequency generator, the same effects as those obtained in the continuous signal case can be obtained.

What is claimed is:

1. A motor speed control apparatus comprising:
   a frequency generator for generating a frequency signal which is proportional to a rotating speed of a motor;
   a period detector for detecting a period of the frequency signal and for outputting a mean speed signal which is proportional to a mean rotating speed of the motor;
   a controller for receiving an externally supplied speed command signal and a speed feedback signal, and for performing a control operation to output a control signal;
   a driver for supplying the motor with a driving current in accordance with the control signal;
   a speed estimator for receiving the control signal and the mean speed signal, and for estimating a rotating speed of the motor from the control signal and the mean speed signal to thereby obtain an estimated speed signal of the motor which is outputted to said controller as the feedback signal, wherein said speed estimator includes:
   a predictor which comprises:
      a multiplier for comparing an estimated mean speed signal obtained by integrating the estimated speed signal with respect to time and the mean speed signal to generate a mean speed error, and for multiplying the mean speed error by a factor $(1+\alpha)$, wherein $\alpha$ is a real number;
      a delay circuit for multiplying an output of a subtractor by the factor $\alpha$, and for delaying the output by a time equal to a period of the frequency signal;
      said subtractor for subtracting an output of said delay circuit from an output of said multiplier thereby generating a predicted value of an instantaneous speed error from the mean speed error; and
   a feedback loop for correcting the estimated speed signal by the predicted value generated by said predictor.

2. The motor speed control apparatus according to claim 1, wherein a period with which said speed estimator outputs the estimated speed signal is shorter than a period with which said period detector outputs the mean speed signal.

3. The motor speed control apparatus according to claim 1, wherein said feedback loop of said speed estimator includes a term which is proportional to the speed error and an integral term of the mean error with respect to time.

4. The motor speed control apparatus according to claim 1, wherein a control band of said feedback loop of said speed estimator is larger than a control band of said controller.

5. The motor speed control apparatus according to claim 1, wherein $\alpha$ is in the range of $0<\alpha<1$.

6. A motor speed control apparatus comprising:
   a frequency generator for generating a frequency signal which is proportional to a rotating speed of a motor;
   a period detector for detecting a period of the frequency signal and for outputting a mean speed signal which is proportional to a mean rotating speed of the motor;
   a controller for receiving an externally supplied speed command signal and a speed feedback signal, and for performing a control operation to output a control signal;
   a driver for supplying the motor with a driving current in accordance with the control signal;
   a speed estimator for receiving the control signal and the mean speed signal, and for estimating a rotating speed of the motor from the control signal and the mean speed signal to thereby obtain an estimated speed signal of the motor which is outputted to said controller as the feedback signal, wherein said speed estimator includes:
   a predictor which comprises:
      a multiplier for multiplying the mean speed signal by a factor $(1+\alpha)$, wherein $\alpha$ is a real number;
      a delay circuit for multiplying an output of a subtractor by the factor $\alpha$, and for delaying the output by a time equal to a period of the frequency signal;
      said subtractor for subtracting an output of said delay circuit from an output of said multiplier thereby generating a predicted value of an instantaneous speed from the mean speed signal; and
   a feedback loop for comparing the predicted value generated by said predictor and the estimated speed signal to generate a speed error and correcting the estimated speed signal by the speed error.

7. The motor speed control apparatus according to claim 6, wherein a period with which said speed estimator outputs the estimated speed signal is shorter than a period with which said period detector outputs the mean speed signal.

8. The motor speed control apparatus according to claim 6, wherein said feedback loop of said speed estimator includes a term which is proportional to the speed error and an integral term of the mean error with respect to time.

9. The motor speed control apparatus according to claim 6, wherein a control band of said feedback loop of said speed estimator is larger than a control band of said controller.

10. The motor speed control apparatus according to claim 6, wherein $\alpha$ is in the range of $0<\alpha<1$.

11. A motor speed control apparatus comprising:
   frequency generating means for generating a frequency signal which is proportional to a rotating speed of a motor;
   period detecting means for detecting a period of the frequency signal and for outputting a mean speed signal which is proportional to a mean rotating speed of the motor;
   control means for receiving an externally supplied speed command signal and a speed feedback signal, and for performing a control operation to output a control signal;

correcting means for correcting the control signal to output a corrected signal;

drive means for supplying the motor with a driving current in accordance with the corrected signal;

speed and torque estimating means for receiving the corrected signal and the mean speed signal, for estimating a rotating speed of the motor and a load torque applied to the motor to thereby obtain an estimated speed signal and an estimated load torque signal, and for outputting the estimated speed signal to said control means as the speed feedback signal and the estimated load torque signal to said correcting means, respectively, wherein said speed and torque estimating means comprises:

predicting means for comparing an estimated mean speed signal obtained by integrating the estimated speed signal with respect to time and the mean speed signal to generate a mean speed error, and for generating a predicted value of an instantaneous speed error from the mean speed error, and a feedback loop for correcting the estimated speed signal by the predicted value generated by said predicting means.

12. The motor speed control apparatus according to claim 11, wherein said predicting means comprises:

a multiplier for multiplying an input signal by a factor $(1+\propto)$, wherein $\propto$ is a real number in the range of $0<\propto<1$;

a delay circuit for multiplying an output of a subtractor by the factor $\propto$ to delay the output by a time equal to a period of the frequency signal;

said subtractor for subtracting an output of said delay circuit from an output of said multiplier, thereby generating an output signal.

13. The motor speed control apparatus according to claim 11, wherein a period with which said speed and load torque estimating means outputs the estimated speed signal is shorter than a period with which said period detecting means outputs the mean speed signal.

14. The motor speed control apparatus according to claim 11, wherein said feedback loop of said speed and load torque estimating means includes a term which is proportional to the speed error and an integral term of the mean error with respect to time.

15. The motor speed control apparatus according to claim 11, wherein a control band of said feedback loop of said speed and load torque estimating circuit is larger than a control band of said control means.

16. A motor speed control apparatus comprising:

frequency generating means for generating a frequency signal which is proportional to a rotating speed of a motor;

period detecting means for detecting a period of the frequency signal and for outputting a mean speed signal which is proportional to a mean rotating speed of the motor;

control means for receiving an externally supplied speed command signal and a speed feedback signal, and for performing a control operation to output a control signal;

correcting means for correcting the control signal to output a corrected signal;

drive means for supplying the motor with a driving current in accordance with the corrected signal;

speed and torque estimating means for receiving the corrected signal and the mean speed signal, for estimating a rotating speed of the motor and a load torque applied to the motor to thereby obtain an estimated speed signal and an estimated load torque signal, and for outputting the estimated speed signal to said control means as the speed feedback signal and the estimated load torque signal to said correcting means, respectively, wherein said speed and torque estimating means comprises:

predicting means for generating a predicted value of an instantaneous speed from the mean speed signal; and a feedback loop for comparing the predicted value generated by said predicting means and the estimated speed signal to generate a speed error and for correcting the estimated speed signal by the speed error thus obtained.

17. The motor speed control apparatus according to claim 16, wherein said predicting means comprises:

a multiplier for multiplying an input signal by a factor $(1+\propto)$, wherein $\propto$ is a real number in the range of $0<\propto<1$;

a delay circuit for multiplying an output of a subtractor by the factor $\propto$ to delay by a time equal to a period of the frequency signal;

said subtractor for subtracting an output of said delay circuit from an output of said multiplier, thereby generating an output signal.

18. The motor speed control apparatus according to claim 16, wherein a period with which said speed and load torque estimating means outputs the estimated speed signal is shorter than a period with which said period detecting means outputs the mean speed signal.

19. The motor speed control apparatus according to claim 16, wherein said feedback loop of said speed and load torque estimating means includes a term which is proportional to the speed error and an integral term of the mean error with respect to time.

20. The motor speed control apparatus according to claim 16, wherein a control band of said feedback loop of said speed and load torque estimating circuit is larger than a control band of said control means.

21. A motor speed control apparatus comprising:

frequency generating means for generating a frequency signal which is proportional to a rotating speed of a motor;

period detecting means for detecting a period of the frequency signal and for outputting a mean speed signal which is proportional to a mean rotating speed of the motor;

control means for receiving an externally supplied speed command signal and a speed feedback signal, and for performing a control operation to output a control signal;

correcting means for correcting the control signal to output a corrected signal;

drive means for supplying the motor with a driving current in accordance with the corrected signal;

speed and torque estimating means for estimating a rotating speed of the motor from the control signal to obtain an estimated speed signal to be outputted to said control means as the speed feedback signal, for comparing the mean speed signal and an estimated mean speed signal obtained by integrating the estimated speed signal with respect to time to generate a mean speed error, and for generating an estimated load torque signal from the mean speed error to be outputted to said correcting means.

22. The motor speed control apparatus according to claim 21, wherein a period with which said speed and load torque estimating means outputs the estimated speed signal is shorter than a period with which said period detecting means outputs the mean speed signal.

23. The motor speed control apparatus according to claim 21, wherein said feedback loop of said speed and load torque estimating means includes a term which is proportional to the speed error and an integral term of the mean error with respect to time.

24. A motor speed control apparatus comprising:

frequency generating means for generating a frequency signal which is proportional to a rotating speed of a motor;

period detecting means for detecting a period of the frequency signal and for outputting a mean speed signal which is proportional to a mean rotating speed of the motor;

control means for receiving an externally supplied speed command signal and a speed feedback signal, and for performing a control operation to output a control signal;

correcting means for correcting the control signal to output a corrected signal;

drive means for supplying the motor with a driving current in accordance with the corrected signal;

speed and torque estimating means for estimating a rotating speed of the motor from the control signal to obtain an estimated speed signal to be outputted to said control means as the speed feedback signal, for generating a predicted value of an instantaneous speed from the predicted value and the estimated speed signal to generate a speed error, and for generating an estimated load torque signal from the speed error to be outputted to said correcting means.

25. The motor speed control apparatus according to claim 24, wherein a period with which said speed and load torque estimating means outputs the estimated speed signal is shorter than a period with which said period detecting means outputs the mean speed signal.

26. The motor speed control apparatus according to claim 24, wherein said feedback loop of said speed and load torque estimating means includes a term which is proportional to the speed error and an integral term of the mean error with respect to time.

* * * * *